J. A. THOMAS.
STRAINER.
APPLICATION FILED MAR. 3, 1917.
1,246,680. Patented Nov. 13, 1917.
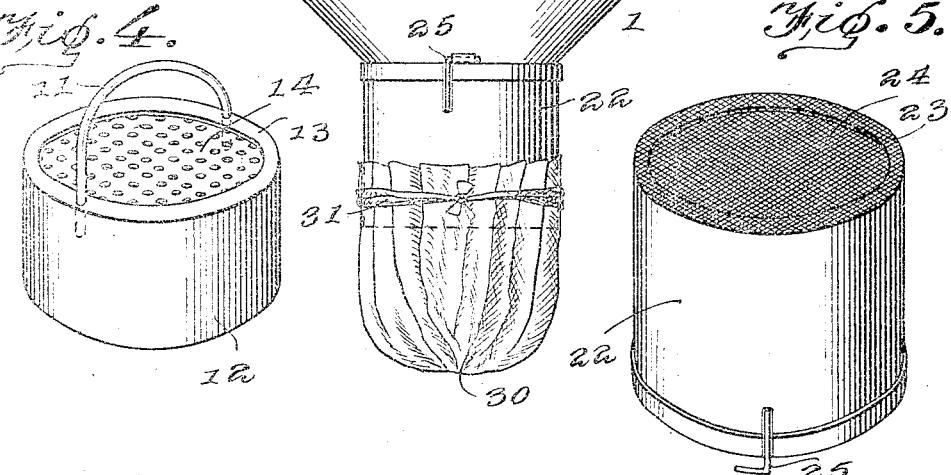
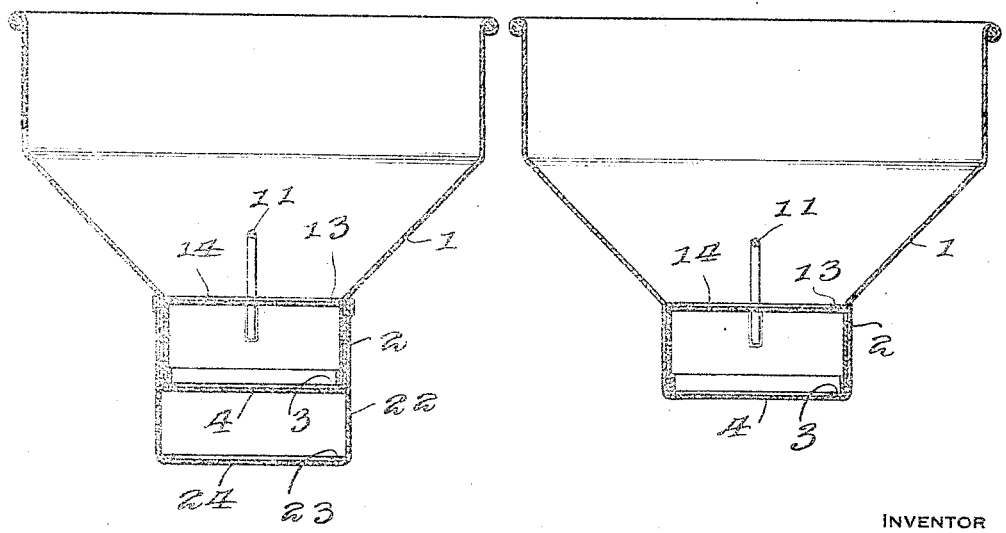
INVENTOR
Joseph A. Thomas
BY Victor J. Evans
ATTORNEY
WITNESSES

UNITED STATES PATENT OFFICE.

JOSEPH A. THOMAS, OF RIDGE, COLORADO.

STRAINER.

1,246,680.   Specification of Letters Patent.   Patented Nov. 13, 1917.

Application filed March 3, 1917. Serial No. 152,279.

*To all whom it may concern:*

Be it known that I, JOSEPH A. THOMAS, a citizen of the United States, residing at Ridge, in the county of Jefferson and State of Colorado, have invented new and useful Improvements in Strainers, of which the following is a specification.

This invention relates to filters, and more especially to strainers; and the object of the same is to produce a funnel having in a neck thereof an improved form of strainer intended for use in taking the sediment and froth out of milk or in removing coarser or finer particles from other liquids.

The invention consists specifically in the provision of a plurality of strainers which may be selectively or collectively employed by the user as the exigencies of the case may demand, in means for readily assembling and disconnecting them, and in the exact construction of parts whereby complicated elements or details of structure are omitted so as to increase the efficiency of the strainer as a whole, render its use extremely easy, and facilitate the cleaning of parts which is necessary where the liquid is oily as is milk, or may be such that it quickly contaminates or chokes the several screens.

Reference is made for details to the following specification, in connection with the accompanying drawings wherein:—

Figure 1 is a general side elevation of this device complete, showing a cloth or bag tied around its lower end and constituting a fourth screen as will be explained herein.

Fig. 2 is a vertical section through the metal parts showing the use of three screens.

Fig. 3 is a similar section showing the third screen removed and leaving but two screens in use.

Figs. 4 and 5 are perspective details of the inner and outer removable members respectively.

In the drawings is shown a metal funnel having a tapering body 1 and a cylindrical neck 2, the latter having at its lower end an inturned metal flange 3, and across the same a strainer 4 composed of a rather fine wire screen as shown. By the words "rather fine" I mean that this wire screen has such a mesh that it will strain most of the finer particles out of the ordinary liquid. I would not be limited to the size of the mesh, but we may call this the intermediate strainer.

The inner member is made up of a ring or collar 12 which fits closely within the neck 2 and has an inturned flange 13 at its upper end, a somewhat coarser wire screen 14 secured around its edges beneath its flange, and a curved or arched handle 11 rising from the edge of the collar. The latter is at the same height as and circumferentially only a little smaller than the neck, and the result is that when this inner member is put in place as seen in Fig. 2 its flanged upper end and therefore the coarser screen stand in horizontal alinement with the angle between the neck 2 and body 1 of the funnel, and the handle rises into said body as seen.

The third and outer member is made up of a sleeve 22 having an inturned flange 23 around its lower end, a fine wire screen 24 secured around its edges to said flange, and fastening devices as indicated by the numeral 25 on the exterior of this member and at appropriate points on the exterior of the body, by means of which the member may be detachably but firmly held in place when it is to be used. The sleeve is of greater length than the upright dimension of the neck 2 so that the fine screen of this member stands at some distance below the intermediate screen of the funnel, and the sleeve is internally only a trifle larger than the exterior of the neck so that it fits closely around the same when connected therewith as at 25.

Finally, as shown in Fig. 1, an additional and fourth screen in the shape of a fabric bag 30 may be employed, and if so it is secured around the sleeve 22 by any suitable means such as a binding ring or tape 31. I will say at this point that the fabric screen is used very rarely.

Thus is constructed a three-element strainer all of metal, and whereof the intermediate member with a screen of intermediate or medium mesh is always employed and is part of the funnel body, rigidly and permanently attached to a flange at the lower end of its neck, and accessible from above and below to the water and the brush or wash cloth employed when this member is to be cleansed. If the parts are of good size, is it quite possible to reach the hand down into the neck and to move the wash cloth and brush around the interior thereof and upon the upper surface of the medium screen. There are no projections or elements of any kind on the interior of the funnel and its neck, against which particles could lie or lodge, and therefore cleaning is rendered easy. The only projection on the exterior thereof is the bayonet joint or fastening device 25, and it is in fact necessary to use but one of these. The inner member fits closely within the neck of the funnel, and all its parts are rigidly connected and readily accessible from the interior and exterior for purposes of cleansing. The outer member also may be readily cleansed from both the interior and exterior, and the only projecting portion is the element 25 of the connection or bayonet joint as seen. The bag or cloth element may be removed entirely and cleaned in boiling water, and if the cleaning receptacle is large enough the inner and outer metal members may also be boiled by immersing them therein, whereas boiling water can of course be poured through the funnel in quantities. I lay emphasis on the fact that the construction of this device is especially adapted to render it most easily cleaned.

In use, when all the screens are employed as indicated in Fig. 1, liquid poured into the funnel flows first through the coarse metal screen, then through the intermediate and finally the finer screen of metal, and eventually through the fabric or cloth bag, which, in fact, might itself contain screening or filtering elements such as powdered charcoal. Thus the liquid treated could be screened even to the point of filtration. But in the ordinary use of this device for screening milk, I would omit the cloth element and assemble the metal members as shown in the drawings elsewhere than in Fig. 1. When the three elements are used, the milk passes first through the coarse screen of the inner member, then through the intermediate screen at the lower end of the funnel-neck, and finally through the fine screen at the lower end of the sleeve 22. The coarse screen removes all particles which may have fallen into the milk and permits the froth to settle down into the screen itself so that the bubbles thereof are broken up, and the intermediate and finer screens act as will be clearly understood. What sediment is collected by each remains upon its upper face. As it is a rule that the finer the screen the more it will collect, the bulk of the sediment will collect upon the lowermost screen, and from time to time the outer member may be detached at 25 and removed and rinsed with water and then replaced, without necessarily cleaning the intermediate screen or the upper screen so often and without necessarily boiling or thoroughly cleaning the entire device. Attention is invited to the fact that the collar 12 is of the same height as the height of the sleeve, so that the upper screen lies across the lower end of the tapering body 1 of the funnel, and particles will collect upon it and will be removed from it when this inner element is lifted out by its handle. Also the height of the sleeve 22 is greater than that of the neck 2, so that a chamber below the intermediate screen and above the lowermost screen is produced wherein the particles collect on the finest screen without banking up and interfering with the passage of the liquid through the intermediate screen. The parts are of the desired sizes and materials, and details other than as described are unimportant.

What is claimed as new is:

The herein described three-part strainer comprising a funnel having a tapering body and a cylindrical neck depending therefrom with an inturned flange at its lower end, and a wire screen of medium mesh secured upon said flange; an inner member consisting of a collar of the same height as said neck and fitting closely but removably within it and having an inturned flange at its upper end, a coarse wire screen secured upon said flange, and an arched handle rising from the upper edge of this collar; and an outer member consisting of a sleeve of greater height than said neck and having an inturned flange at its lower end, a fine mesh wire screen secured upon said flange, and means for detachably connecting the upper end of this sleeve to the body of the funnel.

In testimony whereof I affix my signature.

JOSEPH A. THOMAS.

Copies of this patent may be obtained for five cents each, by addressing the "Commissioner of Patents, Washington, D. C."